United States Patent [19]
Reddy, III. et al.

[11] Patent Number: 5,134,377
[45] Date of Patent: Jul. 28, 1992

[54] TDR SYSTEM AND METHOD FOR DETECTING LEAKAGE OF A LIQUID

[75] Inventors: William J. Reddy, III., Scottsdale; Samuel Berkman, Sun Lakes, both of Ariz.

[73] Assignee: W. L. Gore & Associates, Inc., Newark, Del.

[21] Appl. No.: 710,042

[22] Filed: Jun. 4, 1991

[51] Int. Cl.$^5$ ............................................. G01R 27/04
[52] U.S. Cl. .................................. 324/533; 340/605; 324/534; 324/535
[58] Field of Search ............... 324/532, 533, 534, 535, 324/527, 539, 541, 543, 544; 340/605

[56] References Cited

U.S. PATENT DOCUMENTS

| | | |
|---|---|---|
| 3,981,181 | 9/1976 | Ochiai . |
| 4,023,154 | 5/1977 | Comeaux . |
| 4,029,889 | 6/1977 | Mizuochi ........................ 174/11 R |
| 4,041,381 | 8/1977 | Hwa . |
| 4,104,582 | 8/1978 | Lambertsen . |
| 4,151,459 | 4/1979 | Fayolle et al. ...................... 324/533 |
| 4,165,482 | 8/1979 | Gale . |
| 4,491,782 | 1/1985 | Bellis et al. . |
| 4,739,276 | 4/1988 | Graube ................................ 324/534 |
| 4,766,386 | 8/1988 | Oliver et al. ........................ 324/533 |
| 4,797,621 | 1/1989 | Anderson et al. .................. 324/533 |
| 4,820,991 | 4/1989 | Clark .................................... 324/519 |
| 4,914,394 | 4/1990 | Meyer .................................. 324/534 |
| 4,970,466 | 11/1990 | Bolles et al. ....................... 324/533 |

OTHER PUBLICATIONS

IBM Technical Disclosure Bulletin vol. 21 No. 9 Feb. 1979 J. Szered.

*Primary Examiner*—Kenneth A. Wieder
*Assistant Examiner*—Maura K. Regan
*Attorney, Agent, or Firm*—Samuels, Gary A.

[57] ABSTRACT

A leak detection system and method are disclosed in which an electrical circuit uses time domain reflectometry techniques to monitor one or more leak detection cables for impedance changes which are caused when a cable is contacted by a leaking liquid. The circuit of the system includes an electrical pulse generator means for generating a single electrical launch pulse, and for selectively transmitting the launch pulse down one of the cables. A delay means responsive to the launch pulse produces a reset signal upon the transmission of the launch pulse. A sensing means connected to a selected cable produces a trip signal upon receiving a reflected launch pulse which exceeds one or more predetermined thresholds. A latch means connected to the sensing means latches (sets) upon receiving the trip signal and unlatches upon receiving the reset signal. A counter means which is responsive to the reset signal and the trip signal measures a time difference therebetween. A controller means causes the pulse generator means to generate the launch pulse, determines the predetermined thresholds, and generates a fault status signal in response to the setting of the latch means. The predetermined thresholds are determined for each cable in an autoreferencing step performed by the controller means.

12 Claims, 10 Drawing Sheets

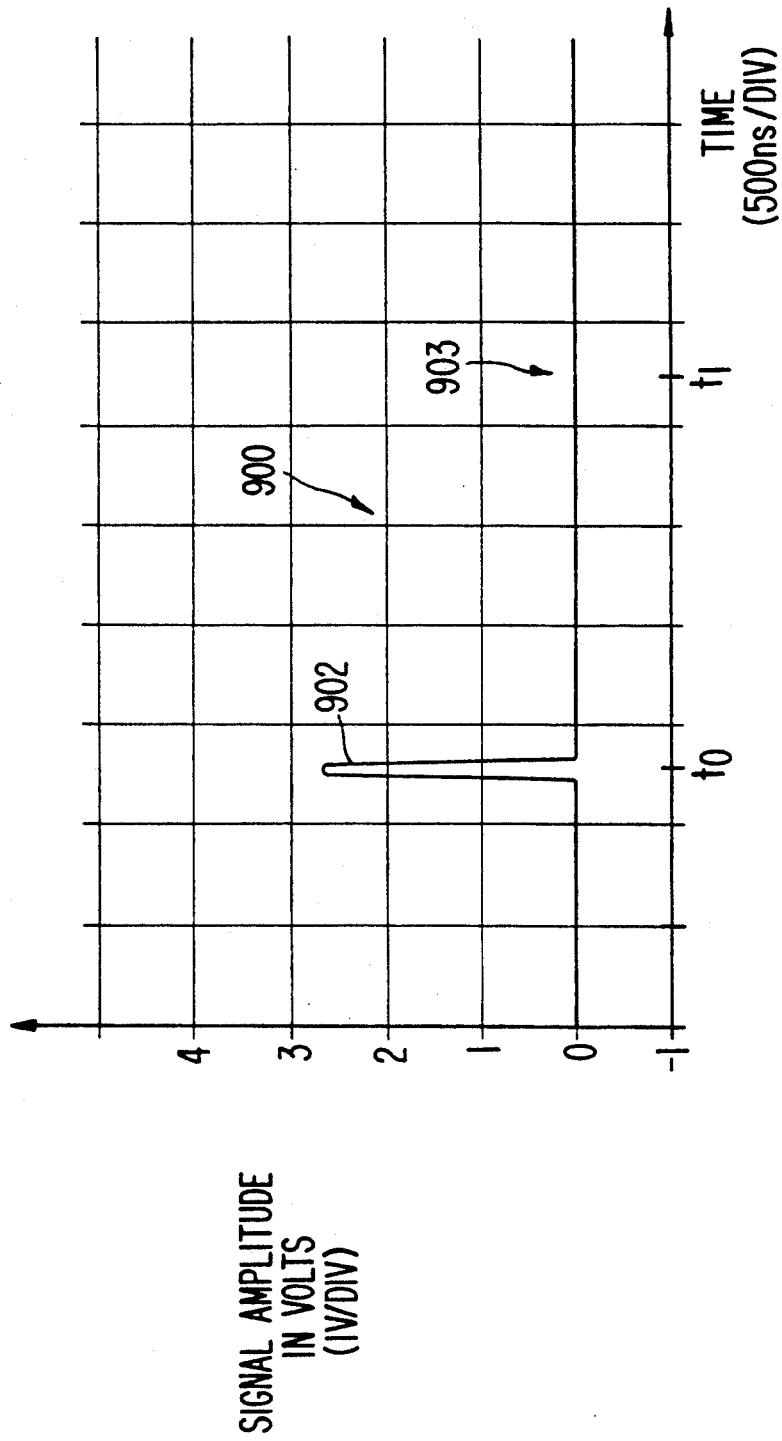

TDR SYSTEM AND METHOD FOR DETECTING LEAKAGE OF A LIQUID

BACKGROUND OF THE INVENTION

1. Field of the Invention

This invention relates generally to the field of leak detection, wherein a leaking fluid causes an impedance change in a sensing cable and the impedance change is detected as an indication of the leak.

2. Related Art

A variety of chemicals (e.g., oils, crude oil, refined petroleum products, gasoline, kerosene, organic solvents, and the like) are stored in underground tanks and transported through buried pipelines. Leakage from these tanks and pipelines can contaminate ground water and cause extensive environmental damage. Further, leaks are difficult to detect and often are not detected until extensive environmental damage has already occurred.

One method of detection has been to run a cable adjacent to the underground pipeline or tank. The cable includes a pair of conductors (e.g., coaxial or twin lead) with a permeable insulation layer disposed therebetween. If a leak occurs, the chemical will permeate the cable and will cause a change in the dielectric properties of the insulation layer such that the impedance of the cable is changed at the point of the leak.

This change in impedance can be sensed and located by time domain reflectometry (TDR) techniques. In TDR, an electrical signal is propagated down the cable, and the cable is monitored for reflections caused by impedance changes in the cable. One difficulty with known TDR systems is that the equipment inherently senses a rise in impedance as the length of the cable increases. This results in a reduced sensitivity to reflections occurring near the far end of the cable.

SUMMARY OF THE INVENTION

The present invention is a leak detection system and method which uses a simple time domain reflectometry (TDR) circuit to monitor one or more leak detection cables for impedance changes which are caused when a cable is contacted by a leaking liquid.

The circuit of the system includes an electrical pulse generator means, a delay means, a sensing means, a latch means, a counter means, and a controller means. The pulse generator means generates a single launch pulse and transmits it down a selected one of the leak detection cables. The sensing means then monitors the cable for reflections. Upon receiving a reflection which exceeds a predetermined threshold, the sensing means produces a trip signal which causes the latching means to be set.

Upon being set, the latch means sends a fault signal to the controller means and stops the counter means. The controller determines the location of the fault from a time measured by the counter.

A portion of the launch pulse is tapped off and delayed by the delay means to produce a reset signal. The reset signal is used to reset the latch means and the counter means after the launch pulse is transmitted down the selected cable.

Prior to normal monitoring, the controller means autoreferences each cable to generate the predetermined thresholds. The autoreferencing step involves determining the normal reflections which can be expected from a cable, and then setting the detection threshold for that particular cable to a value slightly greater than the greatest normal reflection.

It is an advantage of the present invention that a sensitive leak detection system is achieved with a relatively simple circuit.

It is an additional advantage of the invention that multiple cables can be monitored by a single circuit. This feature reduces cost, complexity and power consumption of the TDR circuit.

It is yet another advantage of the invention that the circuit is output versatile in that it provides several interface options allowing, for example, simple integration to other systems such as a computer.

It is another advantage of the invention that broken cables may be sensed.

BRIEF DESCRIPTION OF THE DRAWINGS

FIGS. 9(a)-(c) are plots of sample TDR signals.

The horizontal axis of the plot represents time in seconds. The vertical axis represent the amplitude of the signal in Volts.

PREFERRED EMBODIMENT OF THE PRESENT INVENTION

Figure 1:
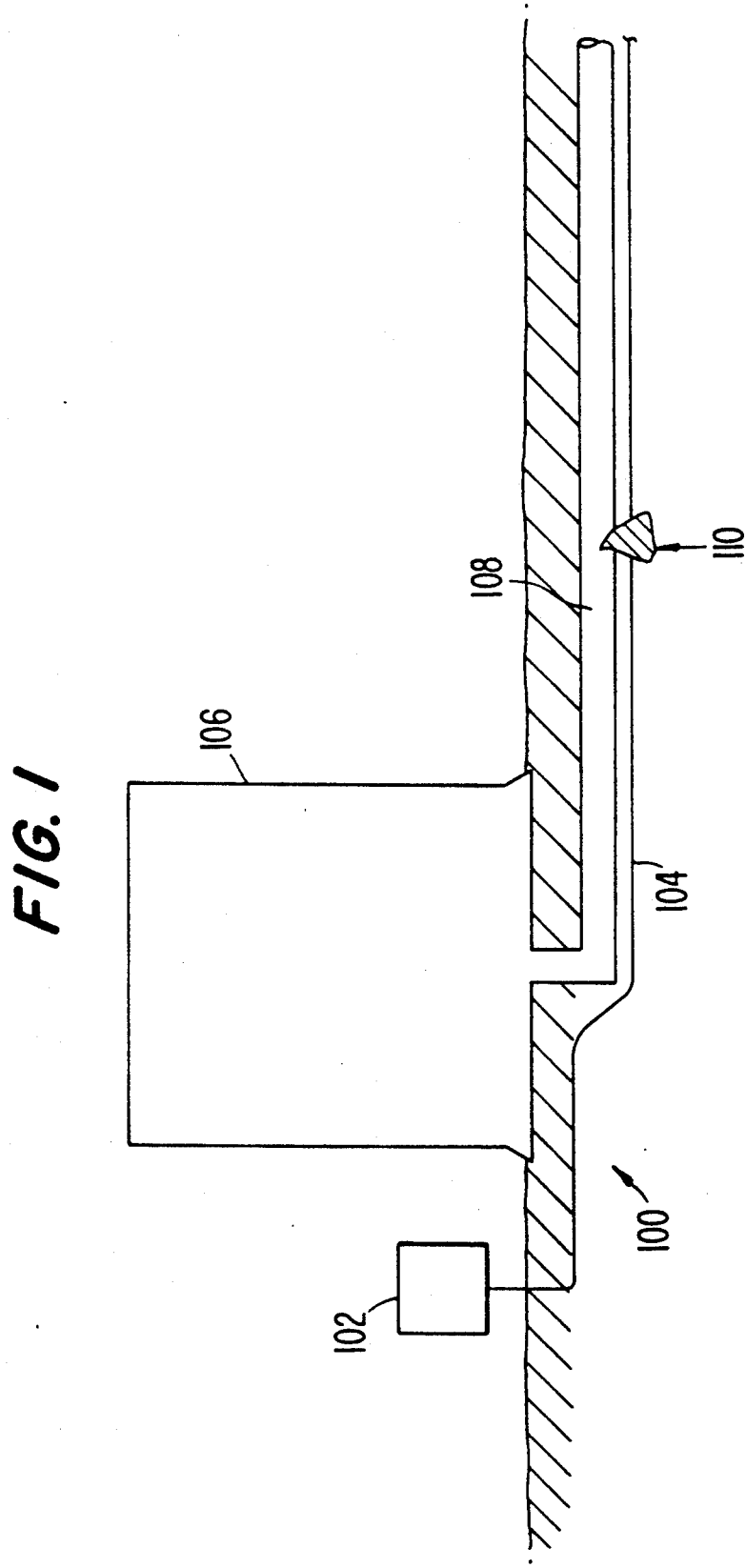
FIG. 1 is a diagram showing the leak detection system of the present invention.

The preferred embodiment of the present invention is now described with reference to the figures. Referring first to FIG. 1, a leak detection system 100 is shown in the environment of a storage tank 105 and a pipeline 108. System 100 includes a time domain reflectometry (TDR) circuit 102 and a leak detection cable 104. Storage tank 106 and pipeline 108 contain a chemical (e.g., fuel oil) for which leak detection is desired. Cable 104 is laid adjacent tank 106 and pipeline 108. One end of cable 104 is connected to TDR circuit 102. The other end of cable 104 is terminated in a matching impedance $Z_0$ (see FIG. 3).

Leak detection cable 104 is a conventional leak detection cable as is known in the art. The specific cable chosen will depend on the properties of the liquid to be detected. In the preferred embodiment, a cable may be used such as that disclosed in U.S. Pat. No. 4,877,923 to Sahakian and available as part number LLF-0126 (water and liquid chemical cable) or LLF-0118 (hydrocarbon cable) from W. L. Gore & Associates, Inc., Wilmington, Del. Examples of other leak detection cables are disclosed in U.S. Pat. Nos. 3,981,181 to Ochiai, 4,029,889 to Mizuochi, 4,206,632 to Suzuki, 4,594,638 to Suzuki, and 4,910,998 to Willis et al.

Figure 2A:
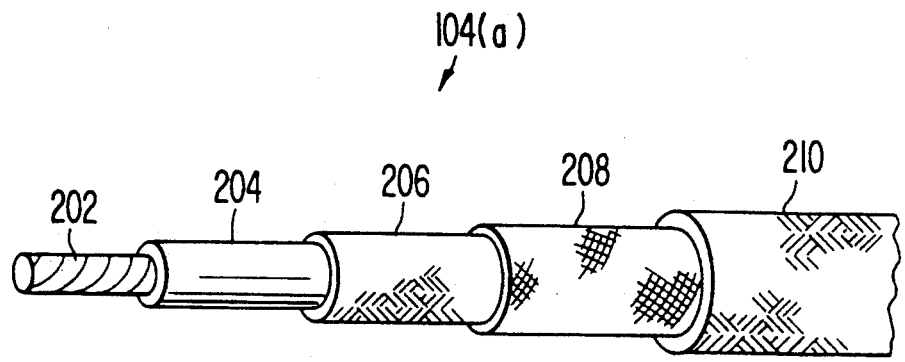
FIGS. 2(a) and (b) show cutaway perspective views of two embodiments of leak detection cable 104.

A first embodiment 104(a) of cable 104 is shown in detail in FIG. 2(a). This embodiment can be used for detecting water as well as liquid chemicals. Cable 104(a) includes an inner conductor 202, a first insulation layer 204, a second insulation layer 206, a coaxial outer conductor 208, and an outer protective layer 210.

First insulation layer 204 is a hydrophobic, micro-porous insulation such as expanded, micro-porous polytetrafluoroethylene (EPTFE). Second insulation layer 206 is a polyester braided filler which is permeable so as to pass chemicals, but is not hydrophobic. Outer conductor 208 is of braided conductive metal construction and is fluid permeable. Protective layer 210 is a permeable material such as polyethylene or polyester and can be woven or braided.

Figure 2B:
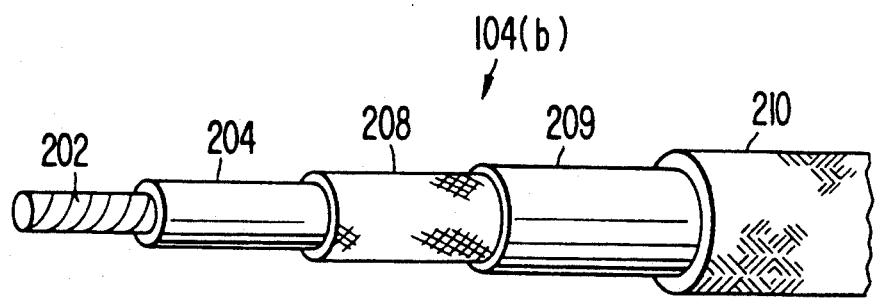

A second embodiment 104(b) of cable 104 is shown in detail in FIG. 2(b). This embodiment can be used for detecting liquid hydrocarbons. Cable 104(b) includes an inner conductor 202, a first insulation layer 204, a coaxial outer conductor 208, an outer hydrophobic layer 209, and an outer protective layer 210.

First insulation layer 204 and hydrophobic layer 209 are both hydrophobic, micro-porous insulation such as EPTFE. Outer conductor 208 is of braided conductive metal construction and is fluid permeable. Protective layer 210 is a permeable material such as polyethylene or polyester and can be woven or braided.

Note that cable 104(a) may be used to sense a variety of liquids (including water), while cable 104(b) is limited to liquids which are capable of permeating hydrophobic layer 209 (e.g., hydrocarbons). The operative difference between the cables is hydrophobic layer 209 of cable 104(b) which prevents water from reaching the conductors such that the impedance of cable 104(b) will not be affected by water. Cable 104(a), on the other hand, allows water to be absorbed into second insulation layer 206 between the conductors such that water can be detected.

The present invention permits a leak detection cable of any characteristic impedance to be used so long as the cable impedance is substantially constant throughout its length. Note, however, that a cable with a low characteristic impedance will provide greater signal attenuation (due to loading effects) such that a shorter length of cable (as compared with a higher impedance cable) must be used for successful monitoring.

Referring now to FIGS. 1 and 2(a), operation of leak detection system 100 is described. If a leak (e.g., leak 110) occurs in tank 106 or pipe 108, the leaking liquid will eventually come into contact with cable 104. In the case of cable 104(a), the liquid will pass through protective layer 210 and conductor 208, and will be absorbed into first insulation layer 204 and second insulation layer 206. The absorbed liquid will cause a change in the dielectric properties of insulation layers 204 and 206. This will result in a change in the impedance of the cable which can be sensed by TDR circuit 102 at a remote end of the cable.

In the case of cable 104(b), shown in FIG. 2(b), the liquid will pass through protective layer 210 and contact hydrophobic layer 209. Only hydrocarbons will pass through layer 209 (i.e., water will be excluded). The hydrocarbon will then pass through outer conductor 208 and will be absorbed into first insulation 204. As with cable 104(a), the absorbed liquid will cause a change in the dielectric properties of insulation layers 204 and 206.

Figure 3:
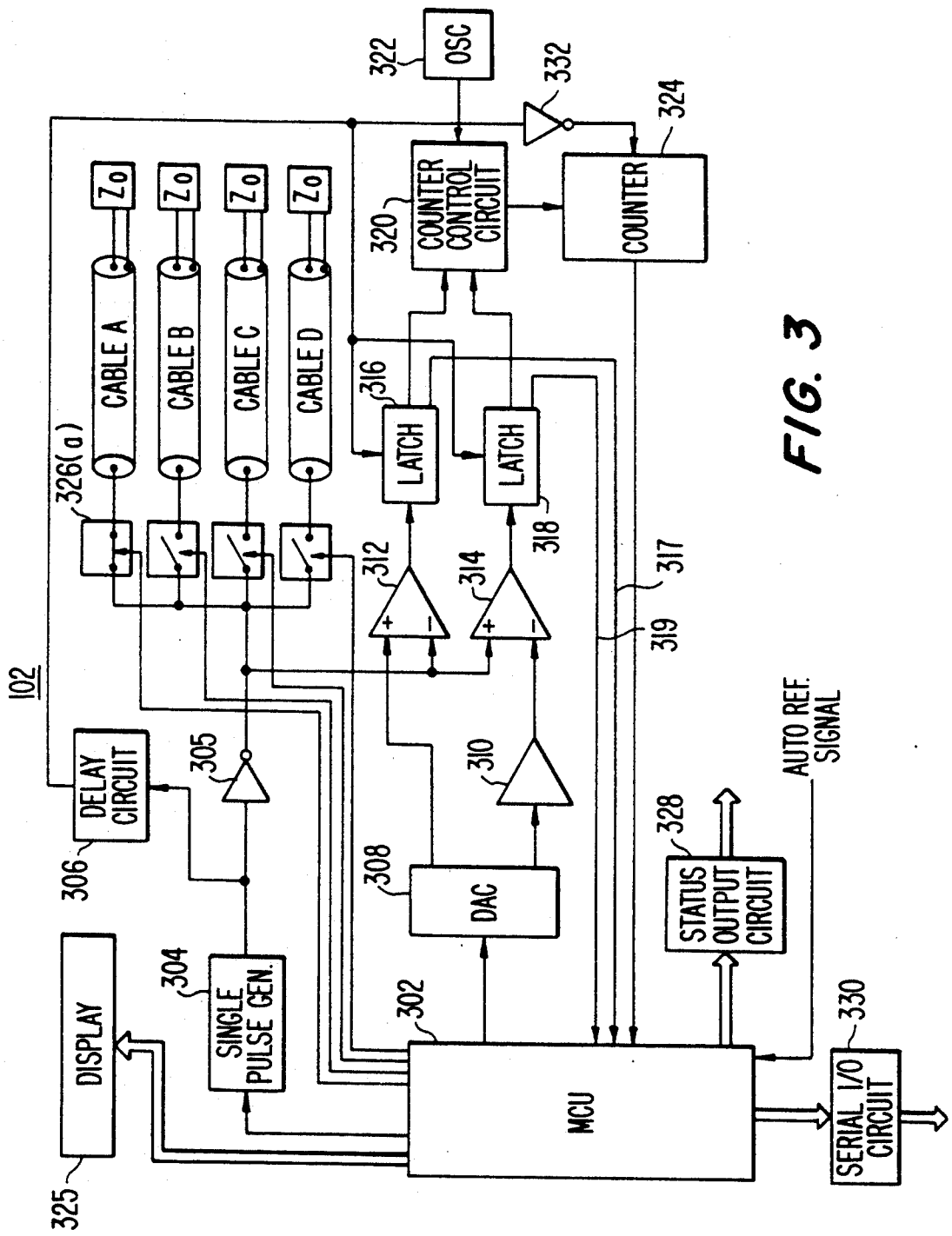
FIG. 3 is a block/schematic diagram of TDR circuit 102 of the present invention.

FIG. 3 shows a block diagram of TDR circuit 102 of the present invention. Circuit 102 includes a microcontroller unit (MCU) 302, an electrical pulse generator 304, an inverter 305, a delay circuit 306, a digital-to-analog converter (DAC) 308, an amplifier 310, comparators 312 and 314, latches 316 and 318, counter control circuit 320, an oscillator 322, an inverter 332, a counter 324, a display 325, a status output circuit 328, and a serial I/O (Input/Output) circuit 330.

The preferred embodiment of TDR circuit 102 is a four channel leak detection/location circuit. Digitally controlled switches 326(a)-326(d) are used to select between leak detection cables A–D. Each leak detection cable is terminated with a matching impedance $Z_0$. $Z_0$ is a resistor having an impedance equal to the characteristic impedance of the leak detection cable.

TDR circuit 102 monitors cables A–D for faults. A fault can be any condition which causes an impedance change in a cable, including shorts, opens, and impedance changes caused by a leaking fluid permeating the insulation between the conductors. A single launch pulse is transmitted down a leak detection cable (i.e., any one of cables A–D). The transmitting end of the cable is then monitored for reflections (i.e., return of a portion of the energy from the launch pulse).

A reflection will occur when the launch pulse encounters an impedance change. A low-to-high impedance transition in the cable (e.g., a faulty connection or break in the cable) will result in a positive reflection, while a high-to-low impedance transition in the cable (e.g., a short or saturation of the cable's dielectric by a leaking liquid) will result in a negative reflection. It is this negative reflection, indicating that the detection cable has come into contact with a leaking fluid, that the present invention is primarily concerned.

By utilizing a single pulse scheme, the impedance rise which is sensed at a far end of a cable, by many known TDR systems, is eliminated. This impedance rise, inherent in many TDR systems, results from the overlap of a reflection and a launch pulse which are simultaneously present in a cable. For example, if a very wide launch pulse is used, then a reflection may overlap a portion of the launch pulse. Similarly, if multiple launch pulses are spaced closely together, then a reflection may overlap a next launch pulse.

The sensitivity to impedance changes at a distant end of the cable is further increased through dispersion of the launch pulse. Propagation down a leak detection cable will attenuate the amplitude of a launch pulse. Dispersion, on the other hand, will cause the width of the launch pulse to increase as it is propagated down the cable. This is a beneficial effect because comparators 312 and 314 require a minimum pulse width at a certain pulse amplitude in order to trip. So long as the pulse amplitude is above the threshold (as applied to the other input of the comparator), pulse amplitude may be traded for pulse width such that dispersion counteracts the amplitude attenuation and thereby increases the sensitivity of TDR circuit 102 to impedance changes at a far end of the cable.

In addition to determining the presence of a leak, it is an object of the invention to locate the position of the leak along the cable. The precise position of the fault (i.e., leak) can be determined by measuring the time required for the launch pulse to reach the fault and return a reflection. This measured time can then be multiplied by the known propagation speed for an electrical signal in the particular cable to determine the distance to the impedance transition. For the preferred cable, the speed of propagation is approximately 0.8 feet per nanosecond.

TDR circuit 102 is adapted to both detect the presence of leaks, and to determine the position of the leak along the cable. Operation of circuit 102 is as follows.

MCU 302 sends a signal to electrical pulse generator 304 causing pulse generator 304 to generate a single launch pulse. The launch pulse is inverted by inverter 305 and passed to one of cables A–D through the appropriate switch 326(a)–326(d). Under normal operating conditions, the launch pulse will propagate down the cable into $Z_0$ and no energy will be reflected back through the switch. If, however, the launch pulse encounters an impedance mismatch, then a portion of the launch pulse will be reflected.

Comparators 312 and 314 monitor the selected cable for reflections. Comparator 312 is adapted to detect positive reflections. Comparator 314 is adapted to detect negative reflections. The inverting input of comparator 312 and the non-inverting input of comparator 314 are connected between the output of inverter 305 and switches 326(a)–(d).

The voltage threshold at which each comparator will trip is set by MCU 302 through DAC 308 for each cable. A first channel of DAC 308 is connected to the non-inverting input of comparator 312. A second channel of DAC 308 is connected to the inverting input of comparator 314 through amplifier 310. As discussed below, amplifier 310 inverts and increases the sensitivity of the signal from DAC 308.

Upon detecting a positive reflection which exceeds a positive detection threshold, comparator 312 will set latch 316. Similarly, upon detecting a negative reflection which exceeds a negative detection threshold, comparator 312 will set latch 316. Setting either of latches 316 or 318 will cause counter control circuit 320 to stop counter 324. In addition, latches 316 and 318 provide status output signals to MCU 302 over status lines 317 and 319, respectively.

Status lines 317 and 319 signal the presence and type of the fault in a cable to MCU 302. Counter 324 provides the propagation time data which MCU 302 uses to determine the position of the fault on the cable.

It is inherent in the configuration of circuit 102 that the launch pulse will be detected by comparators 312 and 314 causing latches 316 and 318 to be set and counter 324 to be stopped. Thus, premature detection occurs and latches 316 and 318, as well as counter 324, must be reset before circuit 102 can effectively monitor the cable for reflections.

After a premature detection, reset is performed as follows Delay circuit 306 taps off a small portion of the energy from the launch pulse and delays it for a short time to produce a reset pulse. The reset pulse is then directed to latches 316 and 318, and to counter 324. The reset pulse causes the latches and the counter to be reset so that the circuit is again available to detect reflections.

Figure 4:
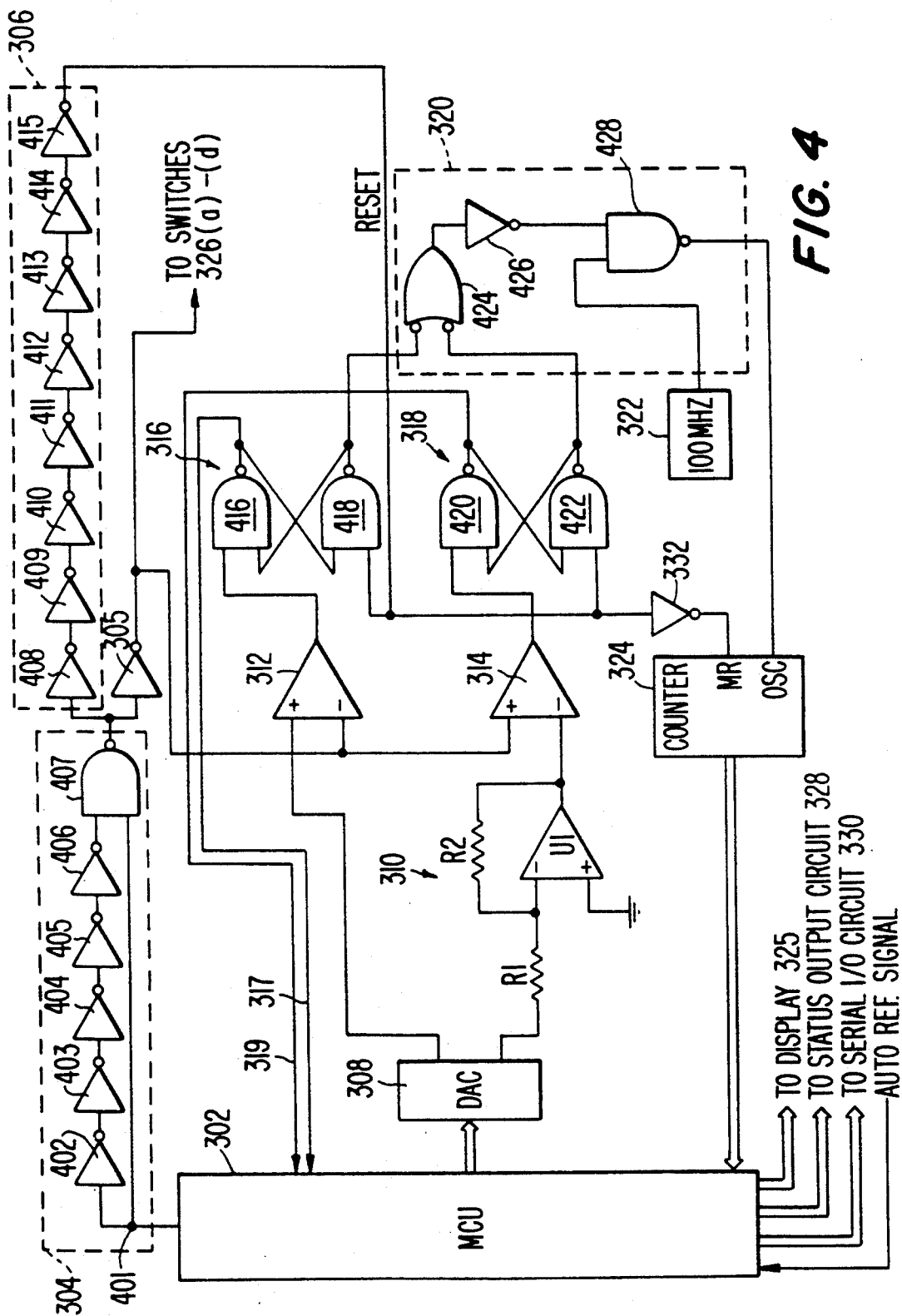
FIG. 4 is a schematic diagram of TDR circuit 102 of the present invention.

The preferred embodiment of TDR circuit 102 is shown in greater detail in FIG. 4. While specific part numbers and configurations are discussed in conjunction with this preferred embodiment, it should be understood that this is done for illustration purposes only. A person skilled in the art will recognize that other components and configurations may be used without departing from the spirit and scope of the invention.

MCU 302 is an MC68HC811E2FN microcontroller from Motorola Semiconductor Products, Inc., Phoenix, Ariz. DAC 308 is an six bit, four channel Digital-to-Analog converter, Motorola part number MC14111. Counter 324 is a 14 stage binary counter available from General Electric Solid State, Somerville, N.J., as part number 74AC7060. Oscillator 322 is a 100 MHz oscillator available as part number MXO55GA2C100 from CTS Corporation, Knights Division, Sandwich, Ill.

Amplifier 310 is a Motorola MC33282 operational amplifier connected in an inverting configuration with input resistor R1 and feedback resistor R2. Comparators 312 and 314 are LM319 comparators from National Semiconductor Corporation, Santa Clara, Calif. All NAND gates are SN74LS00N Quad NAND gates from Texas Instruments Incorporated, Dallas, Tex. All inverters are CD74HC14E Hex inverters from Harris Corporation, Melbourne, Fla.

Latches 316 and 318 are standard RS latches. Latch 316 includes two-input NAND gates 416 and 418. The output of comparator 312 is connected to a first input of NAND gate 416. The output of NAND gate 418 is connected to the other input of NAND gate 416. The output of NAND gate 416 is connected to a first input of NAND gate 418. The output of delay circuit 306 is connected to the other input of NAND gate 418.

Similarly, latch 318 includes two-input NAND gates 420 and 422 The output of comparator 314 is connected to a first input of NAND gate 420. The output of NAND gate 422 is connected to the other input of NAND gate 420. The output of NAND gate 420 is connected to a first input of NAND gate 422. The output of delay circuit 306 is connected to the other input of NAND gate 422.

The outputs of latches 316 and 318 are connected as follows. The output of NAND gate 416 is connected to MCU 302 through status line 317. The output of NAND gate 418 is connected to a first input of a NAND gate 424 of counter control circuit 320. The output of NAND gate 420 is connected to MCU 302 through status line 319. The output of NAND gate 422 is connected to a second input of NAND 424.

Counter control circuit 320 includes NAND gate 424, an inverter 426, and a NAND gate 428. NAND gate 424 is depicted as an OR gate with inverting inputs. While this is the logical equivalent of the NAND function, gate 424 is depicted in this manner to show that the outputs of either latch 316 or latch 318 can stop counter 324. The output of NAND gate 424 is inverted by inverter 426 and NANDed with a clock signal from oscillator 322 by NAND gate 428. The output of NAND gate 428 is connected to an oscillator input of counter 324.

Oscillator 322 provides a 100 MHz clock signal to counter 324. This gives counter 324 a resolution of 10 nanoseconds. At 0.8 feet per nanosecond, this yields a leak location sensitivity of ±4 feet (i.e. 10 ns×0.8 ft/ns÷2).

Only nine of the available 14 bits from counter 324 are used. The first eight bits of the counter are read into MCU 302. The ninth bit is input to the pulse accumulator input (pin 27) of MCU 302. The pulse accumulator input of MCU 302 is connected to an internal 8-bit counter. This results in the equivalent of a 16-bit counter which is capable of providing a timer for a cable length of up to approximately 262,000 feet (i.e., $2^{16}$ bits × 10 ns/bit × 0.8 ft/ns÷2).

Single pulse generator 304 includes inverters 402–406 and a two-input NAND gate 407. Pulse generator 304 produces a single launch pulse in response to a launch signal (i.e., a LOW-to-HIGH transition) from MCU 302. The launch signal is fed to a first input of NAND gate 407. A portion of the launch signal is tapped-off at a terminal 401, delayed by inverters 402-406, and input to the other input of NAND gate 407. NAND gate 407 produces a single launch pulse from the two signals input to it. Inverter 305 inverts the launch pulse from NAND gate 407 to produce a positive launch pulse. Inverter 305 also provides isolation between the cables and delay circuit 306 so that launch pulse reflections are not permitted to reach delay circuit 306 to produce unwanted reset signals.

Delay circuit 306 includes inverters 408-415 connected in series fashion. The output of delay circuit 306 is connected to inputs of NAND gates 418 and 422 and also to a reset terminal of counter 324 through inverter 332.

Switches 326(a)-(d) are not shown in FIG. 4 (see FIG. 3). In the preferred embodiment, switches 326(a)-(d) are single pole, single throw, normally OPEN reed-type relays. Relay part number RLYF-1A005 from Philips ECG of Williamsport, Pa. is preferred. Each relay is controlled by MCU 302 through a drive transistor (not shown).

Figure 5:
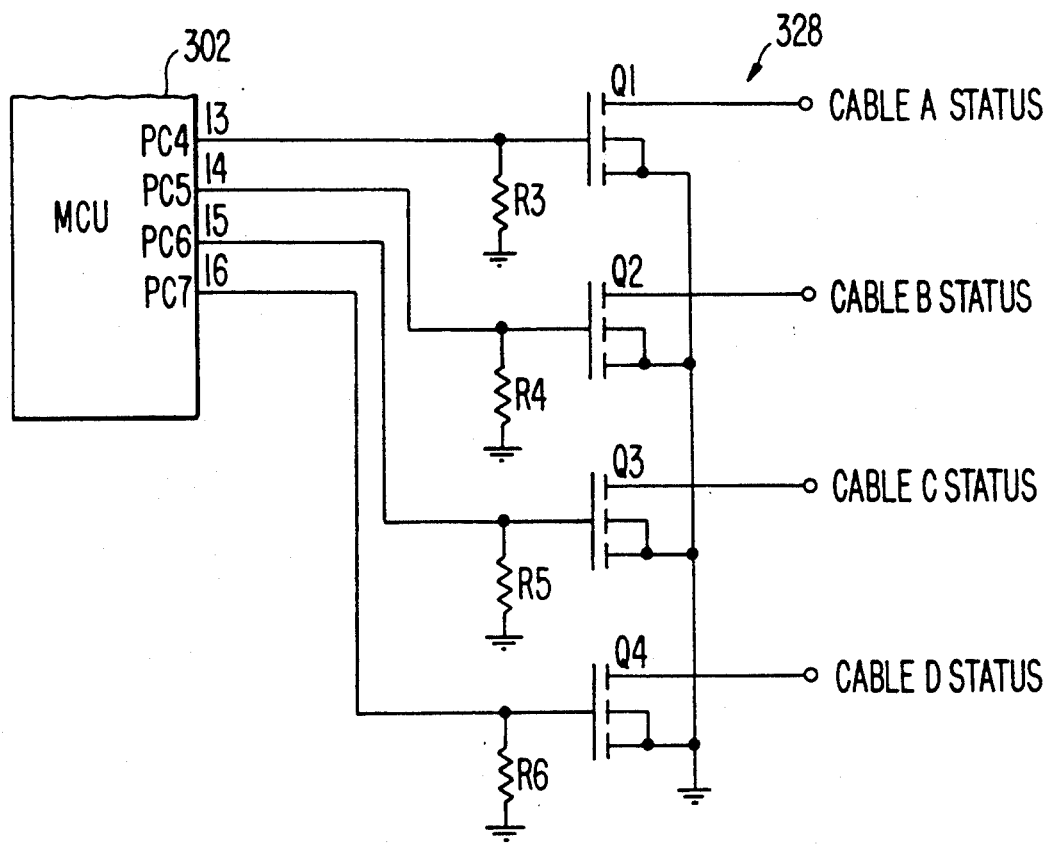
FIG. 5 is a schematic diagram of status output circuit 328.

Status output circuit 328 is shown in FIG. 5. Status lines PC4-PC7 from MCU 302 are connected to the gates of Field Effect Transistors (FET's) Q1-Q4, respectively. Resistors R3-R6 provide bias voltage for transistors Q1-Q4 Circuit 328 provides open drain status outputs for each of cables A-D.

Figure 6:
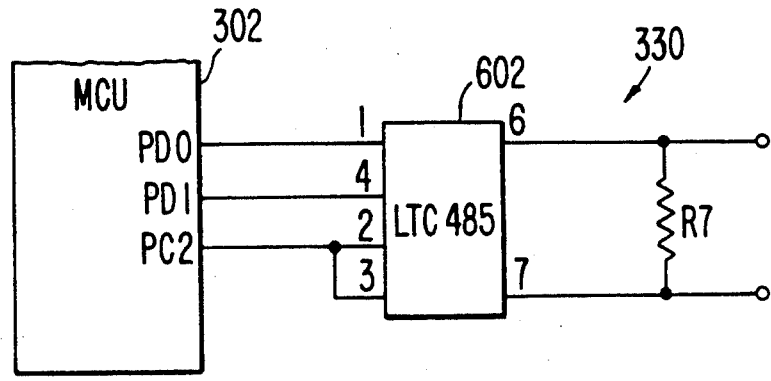
FIG. 6 is a schematic diagram of serial I/O circuit 330.

FIG. 6 show a detail of serial I/O circuit 330. I/O circuit 330 includes an RS422 compatible transceiver 602 and may further include an impedance matching resistor R7. The preferred embodiment of transceiver 602 is part number LTC485 from Linear Technology Corporation of Milpitas, Calif.

I/O circuit 330 performs normal serial communications. The data transferred to MCU 302 through circuit 330 will depend on the programming of MCU 302. Ordinarily, requests for information (e.g., status of the cables and distance to a fault), a remote command to perform autoreferencing, or a test command may be input to MCU 302. Similarly, MCU 302 may output cable status information through circuit 330.

Figure 7:
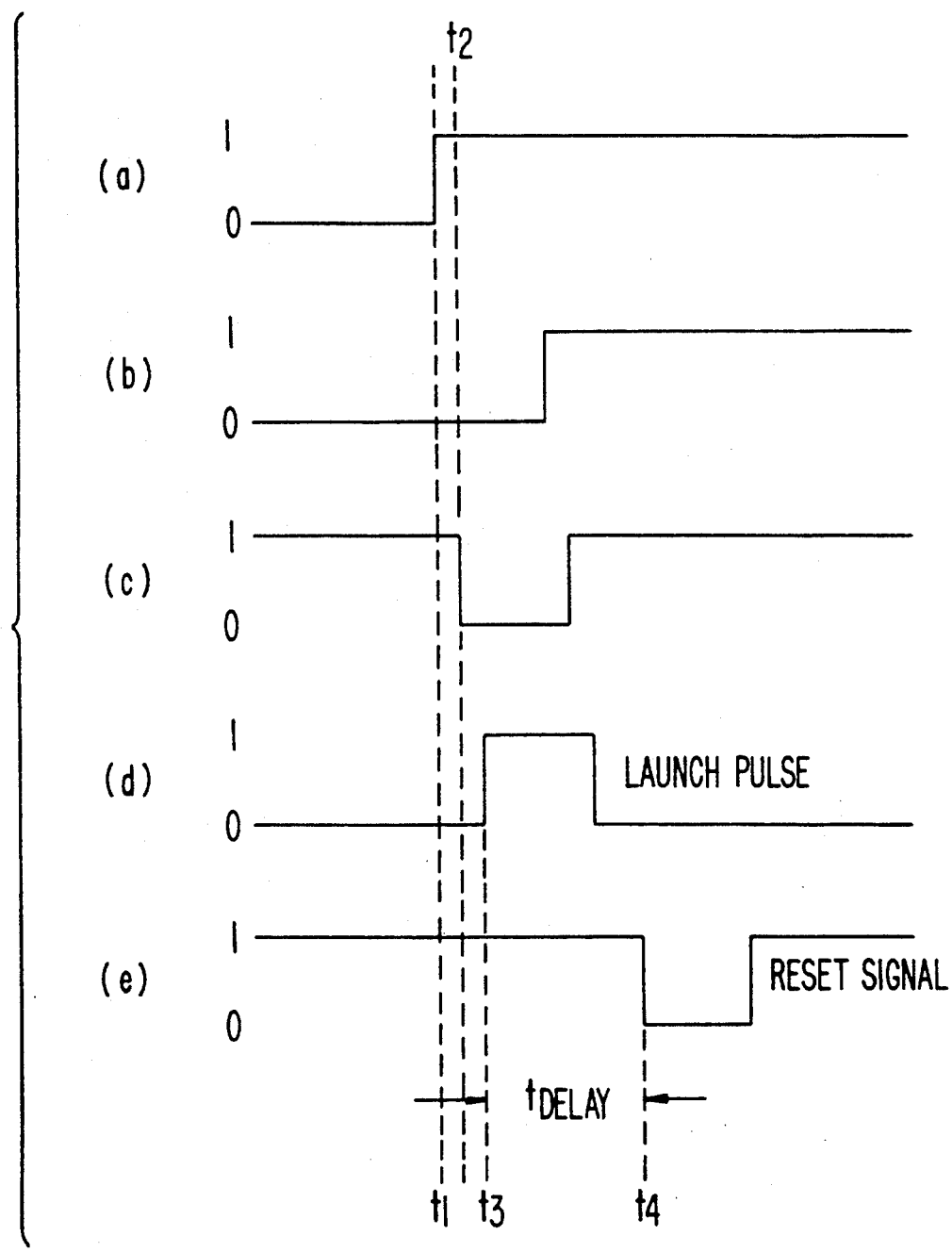
FIGS. 7(a)-(e) provide a sample timing diagram showing relative timing between the launch pulse and the reset pulse.

A sample timing diagram shown in FIGS. 7(a)-(e) illustrates the relative timing between the launch pulse and the reset signal. The horizontal axis of each diagram represents time while the vertical axis represent the logic state (i.e., HIGH or LOW). FIG. 7(a) shows the launch signal from MCU 302 which initiates generation of the launch pulse at time $t_1$.

FIG. 7(b) shows the delayed launch signal which is input to NAND gate 407. FIG. 7(c) shows the output of NAND gate 407 at time $t_3$. The delay between $t_2$ and $t_3$ is introduced by NAND gate 407.

FIG. 7(d) shows the launch pulse which appears at the output of inverter 305 at time $t_3$. FIG. 7(e) depicts the reset signal at the output of inverter 415 at time $t_4$. The reset signal is delayed a time $t_{DELAY}$ equal to $t_4-t_3$ (e.g., the delay of inverters 409-415).

In the specific embodiment set forth above, the width of the launch pulse is approximately 62 ns (nanoseconds). $t_{DELAY}$ is approximately 118 ns. Thus, approximately 118 ns after the launch pulse trips latches 316 and 318, the reset pulse will reset the latches and counter 324.

The delay introduced by this reset scheme creates a "dead zone" at the transmitting end of each cable. By "dead zone", it is meant a portion of a cable for which TDR circuit 102 will be unable to detect any reflections. This occurs because the latches cannot be reset until after the launch pulse has entered a cable. Any reflections occurring prior to reset will not be detected. The "dead zone" is one half the distance traversed by a launch pulse prior to reset. The factor of one half accounts for the fact that the reflection must re-traverse the distance back to TDR circuit 102 before detection can occur.

For example, if reset occurs 118 ns after the launch pulse is transmitted to a cable, then faults will not be detected in the first 47 feet of the cable. That is, a pulse travelling at 0.8 feet per nanosecond can travel 47 feet and be reflected back 47 feet to the transmitter (for a total distance of 94 feet) in 118 ns.

Because circuit 102 is often remotely located from cable 104, a jumper cable may be used to connect circuit 102 to each leak detection cable. If a 50 foot jumper cable is used, then the "dead zone" will be removed from the leak detection cable. The jumper cable should have the same characteristic impedance and velocity of signal propagation as the leak detection cable in order to ensure accurate propagation time/distance calculations and to maintain leak detection sensitivity. The preferred jumper cable is part number LLF-0128 from W. L. Gore and Associates, Inc.

As mentioned above, MCU 302 sets the detection threshold at which comparators 312 and 314 will trip for each leak detection cable. The reference levels for each cable are digitally stored in an EEPROM (Electrically Erasable, Programmable Read Only Memory) internal to MCU 302. DAC 308 converts these digitally stored reference levels to analog signals which are then supplied to comparators 312 and 314.

The non-inverting input of comparator 312 is supplied an upper detection threshold (i.e., a positive voltage level) such that comparator 312 will monitor the leak detection cable for positive reflections symptomatic of breaks in the cable.

Similarly, the inverting input of comparator 314 is supplied a lower detection threshold (i.e., a negative voltage level) such that comparator 314 will monitor the leak detection cable for negative reflections symptomatic of leaks.

The amplitude of a reflection will vary depending on the distance to the fault and on the amount of energy reflected. The greater the impedance mismatch, the greater the reflection. Breaks or opens in the leak detection cable can result in a major impedance change such that very little sensitivity is required for detection. Accordingly, MCU 302 sets the upper detection threshold for comparator 312 at a fixed level allowing sufficient latitude for noise.

This fixed level set for the upper threshold may vary depending on the length of the particular cable to be monitored. The upper level could be fixed by during the programming of MCU 302, and could then be modified as necessary via serial input through I/O circuit 330.

Leaks may result in small reflections for which detection is desired. Accordingly, in order to detect small leaks, it is important to set the detection threshold very near zero. Unfortunately, setting the negative detection threshold near zero is not practical because even in the absence of leaks or breaks along the cable, some reflections will occur. These result from inherent variations in the impedance of a cable. These variations will differ from cable to cable. In addition, noise may also be present in the system.

The present invention solves this problem by pre-characterizing each leak detection cable. Precharacterizing involves determining what level of reflections will occur from the cable under nominal conditions and then setting the detection thresholds just outside of the nominal reflection window. This is performed by TDR circuit 102 in an autoreferencing step.

In the autoreferencing step, the negative detection threshold is set at a maximum positive value by MCU 302 (the threshold is inverted by amplifier 310 to produce the negative threshold). A launch pulse is then sent down a selected cable. If the level of any reflection seen at the non-inverting input of comparator 314 does not exceed the threshold at the inverting input of the comparator, then MCU 302 reduces the detection threshold by one step and repeats the process until a reflection is received which exceeds the threshold. MCU 302 then steps the threshold up one step to complete the autoreferencing of that cable. The negative detection threshold for that particular cable is then stored in the EEPROM internal to MCU 302, where it may be recalled for later use.

In the preferred embodiment, TDR circuit 102 is supplied by a +5 Volt power supply. DAC 308 is a six bit device such that it is capable of outputting an analog voltage between zero and 5 Volts in approximately 78 mV (milliVolt) steps. Only two of the four available channels of DAC 308 are used. A first channel is used to set the upper (positive) detection threshold. A second channel is used to set the lower (negative) detection threshold.

In order to provide greater sensitivity for the lower detection threshold, amplifier 310 attenuates the lower detection threshold voltage. Resistor R2 is chosen to have a value of 1.3 KΩ and resistor R1 is chosen to have a value of 100 KΩ. This yields a net gain of 0.013 for amplifier 310. Such that the lower detection threshold is modified. The modified threshold ranges from 0 to 64 mV and can be stepped in approximately 1 mV steps. Thus, greater sensitivity is provided for the detection of leaks.

While the supply voltage is 5 Volts, the amplitude of the launch pulse as it exits inverter 305 will be somewhat less than 5 Volts (e.g., 3.0 Volts with an 800 foot, 50 Ω cable). This reduction in voltage results from loading of inverter 305 by the cable. The effects of loading will increase as the characteristic impedance of the cable is decreased. This reduction in the amplitude of the launch pulse tends to limit the length of the cable which can be monitored by TDR circuit 102.

The preferred embodiment of circuit 102 is capable of monitoring a cable up to approximately 2000 feet in length. If monitoring is desired for a longer cable, then an active FET pull-up could be used at the output of inverter 305. This would allow a launch pulse of any desired amplitude to be produced.

Figure 8:
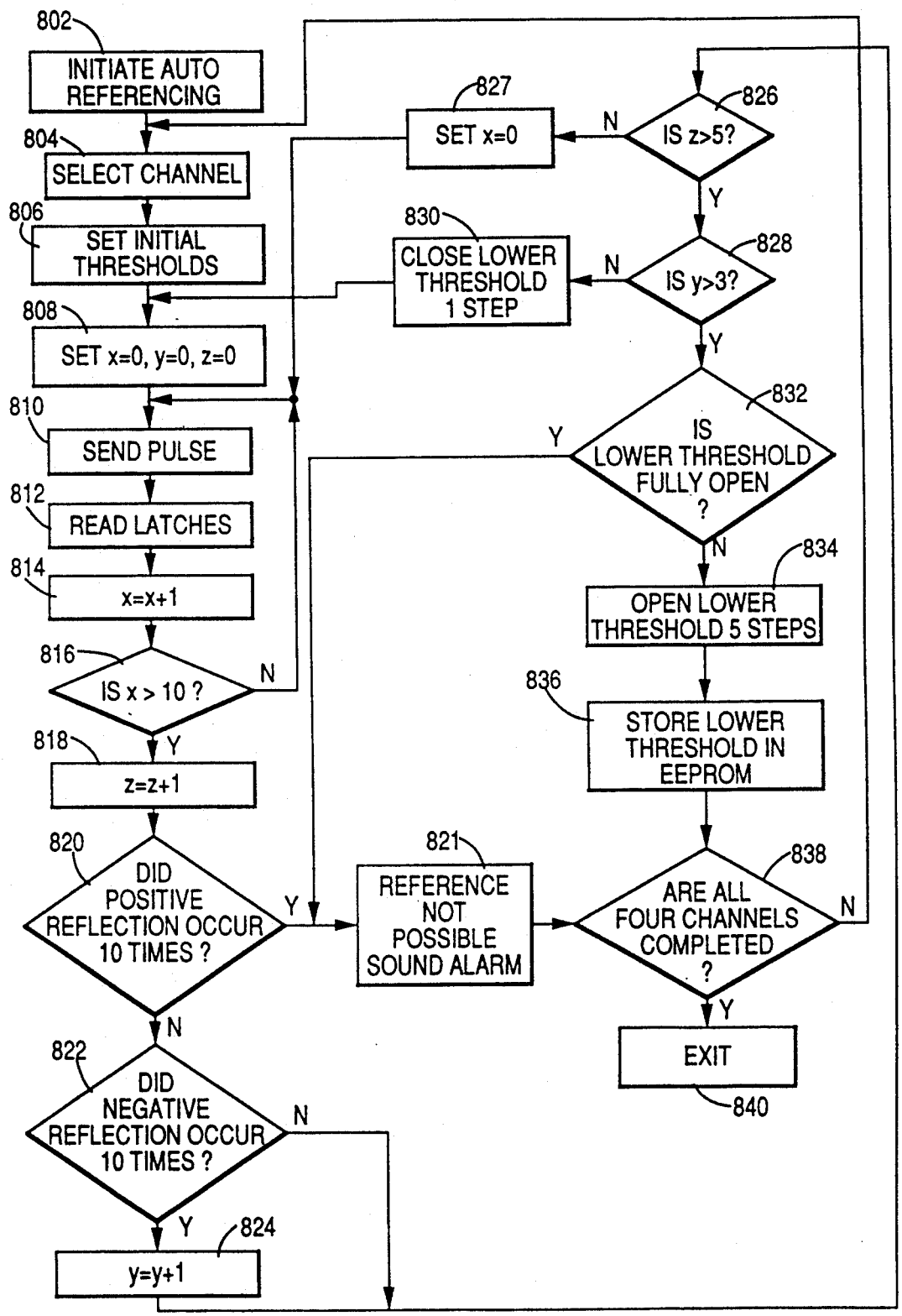
FIG. 8 is a flow chart showing the autoreferencing method of the invention.

The autoreferencing step set forth above is now described in detail with reference to FIG. 8. Autoreferencing is directed by MCU 302 and is initiated at step 802 when an autoreference command is supplied to MCU 302 via a momentary push-button switch or a serial input from I/O circuit 330. "REFERENCING" is displayed on display 325 by MCU 302, and the detection threshold data which is stored in the EEPROM in MCU 302 for each leak detection cable is erased.

At step 804, the first channel is selected. For example, cable A is selected by switching switch 326(a) to the CLOSED position and waiting for the switch to settle. Switches 326(b)-(c) remain OPEN.

At step 806, the upper detection threshold is set at a fixed value (e.g., 0.5 V for an 800 foot cable), and the lower detection threshold is set at the fully "open" value (i.e., maximum value of 64 mV) by MCU 302.

At step 808, three counters (x, y, and z) internal to MCU 302 are reset to zero. These three counters are used to keep track of the repetitive steps which are performed in this process. The repetition is performed in order to achieve an average response from the leak detection cable and to eliminate the effects of noise. The number of repetitions used are a matter of design choice and may be modified to fit the requirements of a particular application.

At step 810, a single launch pulse is transmitted down the cable, and the system waits while it monitors the cable for reflections. At step 812, latches 316 and 318 are read by MCU 302 over status lines 317 and 319, respectively. The status of latches 316 and 318 are stored in an internal latch status register in MCU 302.

Counter x is incremented at step 814. Step 816 causes steps 810-814 to be repeated ten times before proceeding to step 818 where counter z is incremented. The process is repeated ten times to account for noise and to achieve an average response.

At step 820, the latch status data for latch 316 is analyzed to determine if ten positive reflections have occurred. If a positive reflection tripped latch 316 all ten times, then an alarm is sounded at step 821 to signal that referencing may not be possible for the cable. If latch 316 was not tripped ten times, then the process proceeds to step 822.

At step 822, the status data for latch 318 is analyzed to determine whether ten negative reflection have occurred. If latch 318 was tripped 10 times, then counter y is incremented at step 824. If latch 318 was not tripped ten times, then step 824 is by-passed and the process proceeds to step 826.

At step 826, steps 810-824 are caused to be repeated five times before advancing to step 828. Each time steps 810-824 are repeated, counter x is reset at step 827. Step 828 checks to determine if counter y is greater than or equal to three. If y is not greater than or equal to 3, then the lower detection threshold is closed one step (i.e., decremented 1 mV from 64 mV to 63 mV), and steps 808-830 are repeated.

If y is greater than or equal to three, then step 832 determines whether the lower detection threshold is fully open (i.e., 64 mV). If the lower detection threshold is fully open, then an alarm is sounded at step 821 to signal that referencing may not be possible for the cable.

If the lower detection threshold is not fully open at step 832, then the lower detection threshold is opened (increased) by five steps (e.g., 5 mV) at step 834. The lower detection threshold is then stored in the EEPROM of MCU 302 at step 836, and referencing is completed for the selected cable. At step 838, the process is repeated for all four channels before exiting at step 840.

In this manner, each leak detection cable is automatically referenced such that minor impedance changes may be sensed and the sensitivity to leaks is greatly increased. In addition, a defective cable will cause an alarm to be sounded.

As set forth above, the preferred embodiment of circuit 102 is capable of monitoring a cable up to approximately 2000 feet long. Obviously, shorter cables may be used. In addition, the circuit may be capable of monitoring cables in excess of 2000 feet in length if an active pull-up is added to the pulse generator (as discussed above) or if different components that affect the width, amplitude and rise time of the launch pulse are used in the circuit.

A sample TDR trace 900 is shown in FIG. 9(a) for a 800 foot cable having a characteristic impedance of 54 Ω. The amplitude of the signal is shown on the vertical axis with a resolution of 1 Volt per division. Time is shown on the horizontal axis with a resolution of 500 ns per division. A launch pulse 902 having an amplitude of 2.7 Volts is shown at time $t_0$. The end of the leak detection cable 903 is shown at time $t_1$, where $t_1$ is equal to 2 μsec. Note that this trace shows a cable which is terminated in its characteristic impedance such that no reflection occurs from the end of the cable.

Figure 9B:
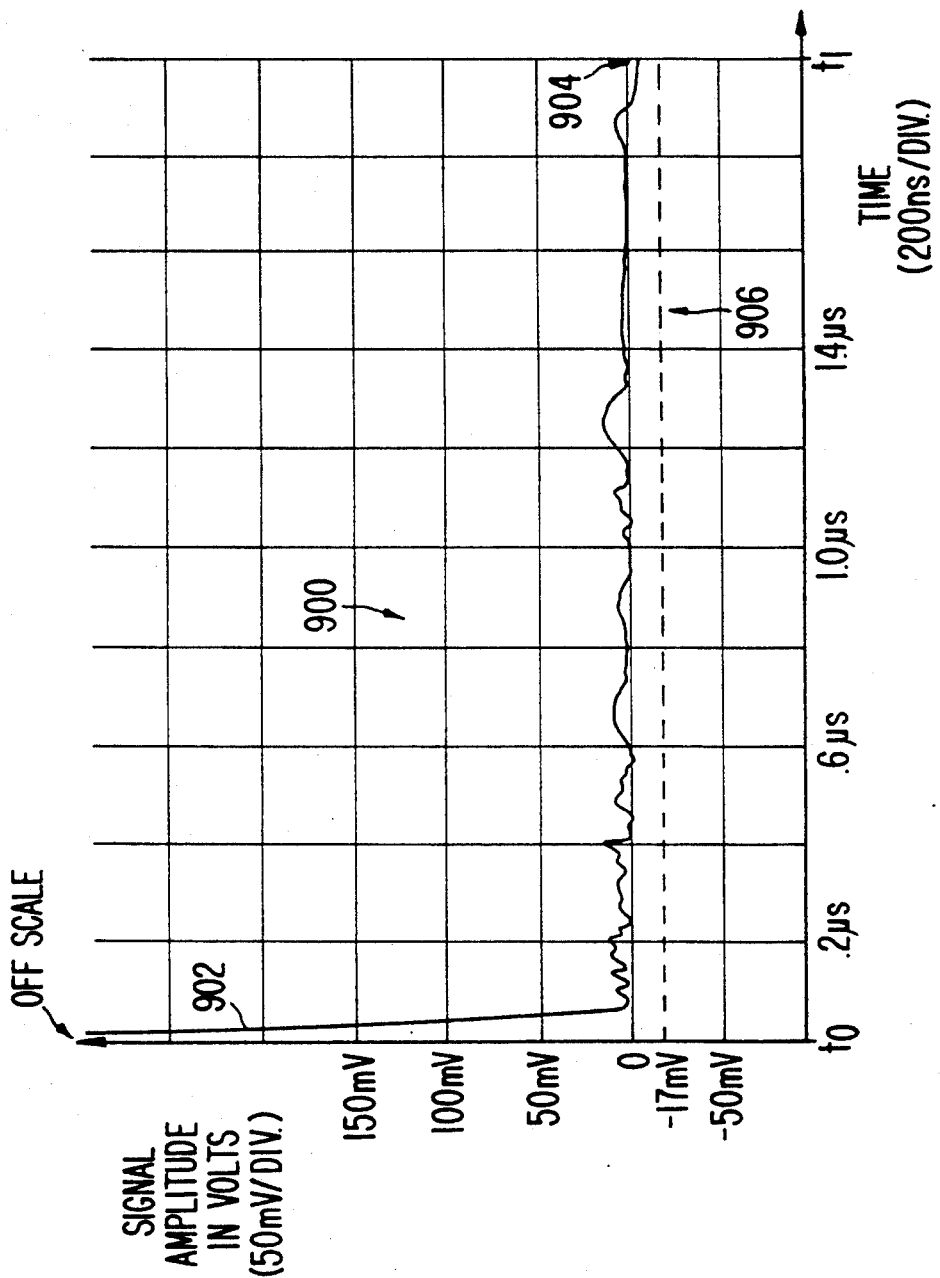

FIG. 9(b) shows TDR trace 900 on expanded voltage and time scales to show the minor reflections. The amplitude of the signal is shown on the vertical axis with a resolution of 50 mV per division. Time is shown on the horizontal axis with a resolution of 200 ns per division. Note that launch pulse 902 is off scale due to the expanded voltage scale. Note also that the largest negative reflection 904 occurs at the end of the cable (i.e., at time $t_1$). Reflection 904 has a peak amplitude of −12 mV. This reflection is due to an impedance mismatch caused by a connector used to connect the leak detection cable to $Z_0$. Autoreferencing of this cable would produce a lower detection threshold (shown by dash line 906) of −17 mV.

Figure 9C:
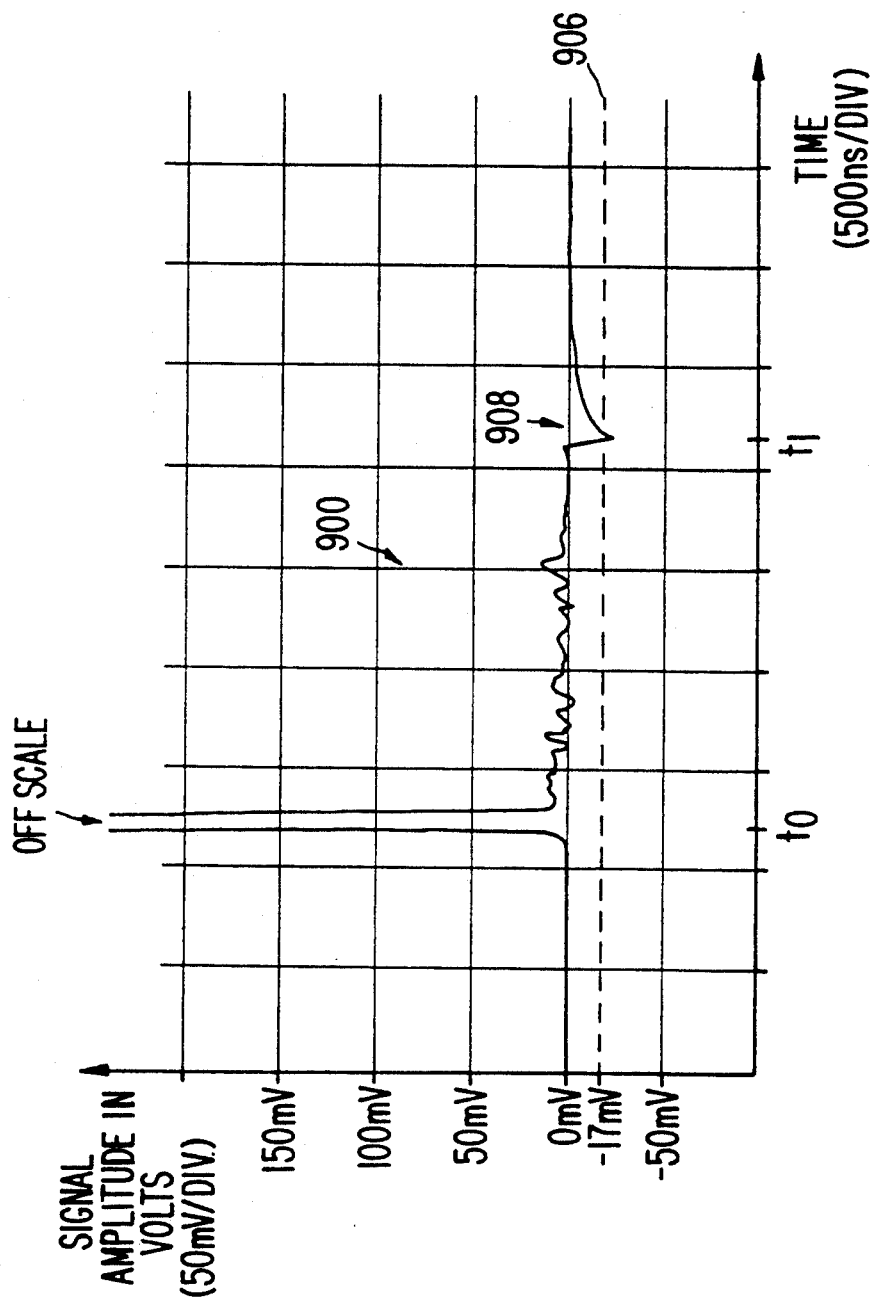

FIG. 9(c) shows TDR trace 900 as it would be modified by a leak occurring at the 800 foot point of the cable. The amplitude of the signal is shown on the vertical axis with a resolution of 50 mV per division. Time is shown on the horizontal axis with a resolution of 500 ns per division. Note that the leak has produced a negative reflection 908 at time $t_1$ which exceeds the lower detection threshold (i.e., dash line 906).

The peak amplitude of reflection 908 is −27 mV and the impedance at the point of the leak is 51 Ω. Thus, for this cable, a leak was detected with only a 3 Ω (i.e., 54Ω−51Ω=3Ω) drop in impedance.

While the preferred embodiment of the invention includes four channels, the invention can easily be implemented with any number of channels. If less than four channels are desired to be used, any unused channel should be terminated by an impedance matching resistor $Z_0$.

Although the invention has been described and illustrated with a certain degree of particularity, it is understood that those skilled in the art will recognize a variety of additional applications and appropriate modifications within the spirit of the invention and the scope of the claims.

What is claimed is:

1. An electrical circuit for detecting leakage of a liquid for use with a leak detection cable which changes impedance when contacted by the liquid, said electrical circuit comprising:
   (a) electrical pulse generator means for generating a single electrical launch pulse, and for transmitting said single electrical launch pulse down the leak detection cable;
   (b) delay means, responsive to said single electrical launch pulse, for producing a reset signal upon the transmission of said single electrical launch pulse;
   (c) sensing means, electrically connected to the leak detection cable, for producing a trip signal upon receiving, from the leak detection cable, a reflected launch pulse which exceeds a predetermined threshold; and
   (d) latch means, connected to said sensing means, for latching upon receiving said trip signal, and for unlatching upon receiving said reset signal, wherein said latching is indicative of a detection of the leakage of the liquid.

2. The electrical circuit of claim 1, further comprising:
   (e) counter means, responsive to said reset signal and to said trip signal, for measuring a time difference therebetween, said time difference being indicative of the relative distance of the leakage disposed along the leak detection cable.

3. The electrical circuit of claim 1, further comprising:
   (f) a microcontroller unit including,
      (1) means for causing said electrical pulse generator means to generate said single electrical launch pulse,
      (2) means for determining said predetermined threshold, and
      (3) means for generating a fault status signal in response to a latching state of said latch means, wherein said fault status signal indicates the leakage.

4. The electrical circuit of claim 1, wherein said sensing means comprises:
   a first voltage comparator, adapted to receive a reflected launch pulse of positive amplitude, to produce a first trip signal when said reflected launch pulse exceeds a positive threshold, said first trip signal being indicative of an open in the leak detection cable, and
   a second voltage comparator, adapted to receive a reflected launch pulse of negative amplitude, to produce a second trip signal when said reflected launch pulse exceeds a negative threshold, said second trip signal being indicative of the leakage of the liquid.

5. The electrical circuit of claim 4, wherein said latch means comprises:
   a first latch responsive to said first trip signal, and
   a second latch responsive to said second trip signal.

6. An electrical circuit for detecting leakage of a liquid for use with a plurality of leak detection cables, each of which changes impedance when contacted by the liquid, said electrical circuit comprising:
   (a) electrical pulse generator means for generating a single electrical launch pulse;
   (b) switch means, connected to said electrical pulse generator means, for selectively coupling a selected one of the plurality of leak detection cables to said electrical pulse generator means such that said single electrical launch pulse is selectively transmitted down said selected one of the plurality of leak detection cables;
   (c) delay means, connected to said electrical pulse generator means, for producing a reset signal upon a transmission of said single electrical launch pulse;
   (d) sensing means, connected to said selected one of the plurality of leak detection cables, for producing a trip signal upon receiving a reflected launch pulse which exceeds a predetermined threshold for said selected one of the plurality of leak detection cables;

(e) latch means, connected to said sensing means, for latching upon receiving said trip signal, and for unlatching upon receiving said reset signal;

(f) a microcontroller unit including,
  (1) means for controlling said switch means wherein any one of said plurality of leak detection cables may be selectively coupled to said electrical pulse generator means,
  (2) means for determining said predetermined threshold for said selected one of the plurality of leak detection cables,
  (3) means for causing said electrical pulse generator means to generate said single electrical launch pulse, and
  (4) means for generating a fault status signal in response to a latching state of said latch means; and (g) counter means, responsive to said reset signal and to said reflected launch pulse, for measuring a time difference therebetween, said time difference being indicative of the relative distance of the leakage disposed along said selected one of the plurality of leak detection cables.

7. The electrical circuit of claim 6, wherein said sensing means comprises:
  a first voltage comparator, adapted to receive a reflected launch pulse of positive amplitude, to produce a first trip signal when said reflected launch pulse exceeds a positive threshold, said first trip signal being indicative of an open in said selected one of the plurality of leak detection cables, and
  a second voltage comparator, adapted to receive a reflected launch pulse of negative amplitude, to produce a second trip signal when said reflected launch pulse exceeds a negative threshold, said second trip signal being indicative of the leakage of the liquid.

8. The electrical circuit of claim 7, wherein said latch means comprises:
  a first latch responsive to said first trip signal, and
  a second latch responsive to said second trip signal.

9. A system for detecting leakage of a liquid, said system comprising
  (a) a plurality of leak detection cables, each of said plurality of leak detection cables having two substantially parallel conductors with a permeable insulator disposed therebetween, each of said plurality of leak detection cables exhibiting a change of impedance when contacted by the liquid;
  (b) electrical pulse generator means for generating a single electrical launch pulse;
  (c) switch means, connected to said electrical pulse generator means, for selectively coupling a selected one of said plurality of leak detection cables to said electrical pulse generator means such that said single electrical launch pulse is selectively transmitted down said selected one of said plurality of leak detection cables;
  (d) delay means, connected to said electrical pulse generator means, for producing a reset signal upon a transmission of said single electrical launch pulse;
  (e) sensing means, connected to said selected one of said plurality of leak detection cables, for producing a trip signal upon receiving a reflected launch pulse which exceeds a predetermined threshold for said selected one of the plurality of leak detection cables;
  (f) latch means, connected to said sensing means, for latching upon receiving said trip signal, and for unlatching upon receiving said reset signal;

(g) a microcontroller unit including,
  (1) means for controlling said switch means wherein any one of said plurality of leak detection cables may be selectively coupled to said electrical pulse generator means,
  (2) means for determining said predetermined threshold for said selected one of the plurality of leak detection cables,
  (3) means for causing said electrical pulse generator means to generate said single electrical launch pulse, and
  (4) means for generating a fault status signal in response to a latching state of said latch means; and (h) counter means, responsive to said reset signal and to said reflected launch pulse, for measuring a time difference therebetween, said time difference being indicative of the relative distance of the leakage disposed along said selected one of said plurality of leak detection cables.

10. The system of claim 9, wherein said sensing means comprises:
  a first voltage comparator, adapted to receive a reflected launch pulse of positive amplitude, to produce a first trip signal when said reflected launch pulse exceeds a positive threshold, said first trip signal being indicative of an open in the leak detection cable, and
  a second voltage comparator, adapted to receive a reflected launch pulse of negative amplitude, to produce a second trip signal when said reflected launch pulse exceeds a negative threshold, said second trip signal being indicative of the leakage of the liquid.

11. The system of claim 10, wherein said latch means comprises:
  a first latch responsive to said first trip signal, and
  a second latch responsive to said second trip signal.

12. A method for monitoring an impedance of each of a plurality of leak detection cables, wherein for each of the plurality of leak detection cables a position of an impedance change is determined and a fault signal is generated in response to the impedance change, said method comprising the steps of:
  (1) autoreferencing each of said plurality of leak detection cables to establish a predetermined threshold for each of the plurality of leak detection cables;
  (2) generating a single electrical launch pulse;
  (3) selectively transmitting said launch pulse down one of the plurality of leak detection cables;
  (4) generating a reset signal by tapping off and delaying a portion of said single electrical launch pulse;
  (5) monitoring said one of the plurality of leak detection cables for a reflected launch pulse;
  (6) comparing said reflected launch pulse to said predetermined threshold for said one of the plurality of leak detection cables, and generating a trip signal when said reflected launch pulse exceeds said predetermined threshold;
  (7) setting a latch and generating a fault signal in response to said trip signal;
  (8) resetting a latch in response to said reset signal;
  (9) measuring a time between steps (7) and (8) and determining, in accordance with said time, the position of the impedance change of said one of the plurality of leak detection cables; and
  (10) repeating steps (2) through (9) for each of the plurality of leak detection cables.

* * * * *